US008774640B2

(12) United States Patent
Xiao et al.

(10) Patent No.: US 8,774,640 B2
(45) Date of Patent: Jul. 8, 2014

(54) METHOD AND DEVICE FOR TRANSMITTING OPTICAL CHANNEL TRANSPORT UNIT SIGNAL

(75) Inventors: Xin Xiao, Shenzhen (CN); Qiuyou Wu, Shenzhen (CN); Maarten Petrus Joseph Vissers, Amsterdam (NL)

(73) Assignee: Huawei Technologies Co., Ltd., Shenzhen (CN)

( * ) Notice: Subject to any disclaimer, the term of this patent is extended or adjusted under 35 U.S.C. 154(b) by 258 days.

(21) Appl. No.: 13/234,991

(22) Filed: Sep. 16, 2011

(65) Prior Publication Data

US 2012/0002671 A1    Jan. 5, 2012

Related U.S. Application Data

(63) Continuation of application No. PCT/CN2010/071058, filed on Mar. 16, 2010.

(30) Foreign Application Priority Data

Mar. 16, 2009  (CN) .......................... 2009 1 0127581

(51) Int. Cl.
    *H04B 10/30* (2006.01)
(52) U.S. Cl.
    USPC ............................................ 398/140; 370/535
(58) Field of Classification Search
    USPC ............................................ 370/539; 398/140
    See application file for complete search history.

(56) References Cited

U.S. PATENT DOCUMENTS

| 2004/0202198 | A1  | 10/2004 | Walker et al. |       |
|--------------|-----|---------|---------------|-------|
| 2007/0076769 | A1* | 4/2007  | Zou ............................ | 370/539 |
| 2007/0269218 | A1* | 11/2007 | Zhang ......................... | 398/140 |

FOREIGN PATENT DOCUMENTS

| CN | 1984018 A       | 6/2007  |
| CN | 101299649 A     | 11/2008 |
| EP | 1 657 839 A1    | 5/2006  |
| EP | 1 826 926 A1    | 8/2007  |
| WO | WO 2008/101377 A1 | 8/2008 |

OTHER PUBLICATIONS

Partial translation of Office Action dated Dec. 31, 2012 in connection with Chinese Patent Application No. 200910127581.4.
International Search Report dated May 27, 2010 in connection with International Patent Application No. PCT/CN2010/071058.
ITU-T G.709/Y.1331, "Interfaces for the Optical Transport Network (OTN)", Mar. 2003, 117 pages.
Written Opinion of the International Searching Authority dated May 27, 2010 in connection with International Patent Application No. PCT/CN2010/071058.
Supplementary European Search Report dated Feb. 23, 2012 in connection with European Patent Application No. EP 10 75 3113.

* cited by examiner

*Primary Examiner* — Helal A Algahaim
*Assistant Examiner* — Mahmoud Ismail

(57) ABSTRACT

A method and a device for transmitting an Optical Channel Transport Unit signal are disclosed in the present invention. The method includes: receiving an Optical Channel Transport Unit OTUk signal after photoelectric conversion; wrapping the OTUk signal into an Optical Channel Data Unit (ODU) signal; multiplexing and mapping the ODU signal to an Optical Channel Payload Unit OPUj signal, where the OPUj signal is a High Order signal of the ODU signal; and wrapping the OPUj signal into an ODUj signal and an OTUj signal, and sending the ODUj signal and the OTUj signal. Through the embodiments of the present invention, fully transparent transmission of an OTU signal can be implemented.

11 Claims, 8 Drawing Sheets

FIG. 4

METHOD AND DEVICE FOR TRANSMITTING OPTICAL CHANNEL TRANSPORT UNIT SIGNAL

CROSS-REFERENCE TO RELATED APPLICATIONS

This application is a continuation of International Application No. PCT/CN2010/071058, filed on Mar. 16, 2010, which claims priority to Chinese Patent Application No. 200910127581.4, filed on Mar. 16, 2009, both of which are hereby incorporated by reference in their entireties.

TECHNICAL FIELD

The present invention relates to the field of optical communications technologies, and in particular, to a method and a device for transmitting an Optical Channel Transport Unit signal.

BACKGROUND

With the rapid development of data services, transport networks of the data services have been significantly developed. A Wavelength Division Multiplexing (Wavelength Division Multiplexing, WDM) system can satisfy the demand for continuously increasing bandwidth required for the data services. An Optical Transport Network (Optical Transport Network, OTN) can provide a solution to flexible scheduling and grooming of wavelengths and sub-wavelengths of the WDM system. Therefore, the OTN is developing gradually. In the OTN, first, an optical signal needs to be converted into an electrical signal through photoelectric conversion, where the most basic electrical signal unit is an Optical Channel Transport Unit (Optical Channel Transport Unit-k, OTUk). The structure of the OTUk includes an Optical Channel Data Unit (Optical Channel Data Unit-k, ODUk) part, and the structure of the ODUk includes an Optical Channel Payload Unit (Optical Channel Payload Unit-k, OPUk) part. Currently, electrical signal units in the case that k=1, 2, 3 exist.

In the OTN, an OTUk signal is transmitted among OTN devices in the network through an OTUk interface. When the OTUk signal is to traverse the network of an operator, data in the OTUk signal needs to be transparently transmitted, and no modification can be performed on the data of the OTUk signal. In the prior art, in order to ensure transparent transmission of the data in the OTUk signal, first, the OTUk signal is unwrapped into an ODUk signal; then, the ODUk signal is transparently transmitted end-to-end; and afterward, the ODUk signal is wrapped into an OTUk signal. It can be seen from the preceding procedure that, in the prior art, only an ODUk signal is transparently transmitted, and fully transparent transmission of an OTUk signal cannot be implemented.

SUMMARY

The present invention provides a method and a device for transmitting an Optical Channel Transport Unit signal, so as to solve the problem in the prior art that fully transparent transmission of an OTUk signal cannot be implemented.

A method for transmitting an Optical Channel Transport Unit signal provided in an embodiment of the present invention includes:

receiving an Optical Channel Transport Unit OTUk signal after photoelectric conversion;

wrapping the OTUk signal into an Optical Channel Data Unit ODU signal;

multiplexing and mapping the ODU signal to an Optical Channel Payload Unit OPUj signal, where the OPUj signal is a High Order signal of the ODU signal; and wrapping the OPUj signal into an ODUj signal and an OTUj signal, and sending the ODUj signal and the OTUj signal.

A method for transmitting an Optical Channel Transport Unit signal further provided in an embodiment of the present invention includes:

receiving an Optical Channel Transport Unit OTUj signal after photoelectric conversion;

unwrapping the OTUj signal into an Optical Channel Data Unit ODUj signal and a payload part of an Optical Channel Payload Unit OPUj signal;

demapping and demultiplexing the payload part of the OPUj signal to obtain an Optical Channel Data Unit ODU signal, where the OPUj signal is a High Order signal of the ODU signal; and unwrapping the ODU signal to obtain an OTUk signal and sending the OTUk signal.

A device for transmitting an Optical Channel Transport Unit signal provided in an embodiment of the present invention includes:

a first receiving module, configured to receive an Optical Channel Transport Unit OTUk signal after photoelectric conversion;

a wrapping module, connected with the first receiving module, configured to wrap the OTUk signal into an Optical Channel Data Unit ODU signal;

a multiplexing module, connected with the wrapping module, configured to multiplex and map the ODU signal to an Optical Channel Payload Unit OPUj signal, where the OPUj signal is a High Order signal of the ODU signal; and a first sending module, connected with the multiplexing module, configured to wrap the OPUj signal into an ODUj signal and an OTUj signal and send the ODUj signal and the OTUj signal.

A device for transmitting an Optical Channel Transport Unit signal further provided in an embodiment of the present invention includes:

a second receiving module, configured to receive an Optical Channel Transport Unit OTUj signal after photoelectric conversion;

an unwrapping module, connected with the second receiving module, configured to unwrap the OTUj signal into an Optical Channel Data Unit ODUj signal and a payload part of an Optical Channel Payload Unit OPUj signal;

a demultiplexing module, connected with the unwrapping module, configured to demap and demultiplex the payload part of the OPUj signal to obtain an Optical Channel Data Unit ODU signal, where the OPUj signal is a High Order signal of the ODU signal; and a second sending module, connected with the demultiplexing module, configured to unwrap the ODU signal to obtain an OTUk signal, and send the OTUk signal.

It can be known from the preceding technical solutions that, being different from the prior art where an OTUk signal is unwrapped into an ODU signal, in the embodiments of the present invention, the OTUk signal is wrapped into the ODU signal, so that fully transparent transmission of the OTUk signal can be implemented.

BRIEF DESCRIPTION OF THE DRAWINGS

FIG. 4 is a schematic diagram of time slots after an OPU2 signal according to the first embodiment of the present invention;

DETAILED DESCRIPTION

The technical solutions of the present invention are described in further detail in the following with reference to the accompanying drawings and embodiments.

Figure 1:
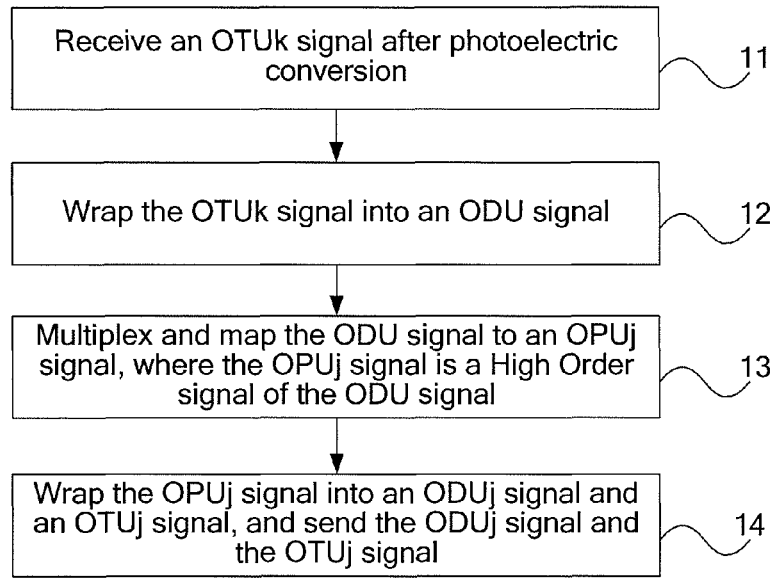
FIG. 1 is a schematic flow chart of a method according to a first embodiment of the present invention.

FIG. 1 is a schematic flow chart of a method according to a first embodiment of the present invention. This embodiment is designed for an uplink direction, that is, a direction of conversion from a Low Order (Low Order, LO) electrical signal to a High Order (High Order, HO) electrical signal. As shown in FIG. 1, this embodiment includes:

Step 11: A device for transmitting an OTU signal receives a first OTU signal (OTUk signal) after photoelectric conversion.

Step 12: The device wraps the OTUk signal into an ODU signal.

Step 13: The device multiplexes and maps the ODU signal to an OPUj signal, where the OPUj signal is a High Order signal of the ODU signal.

Step 14: The device wraps the OPUj signal into an ODUj signal and a second OTU signal (OTUj signal), and sends the ODUj signal and the second OTU signal.

Specifically, step 12 may be as follows.

Figure 2:
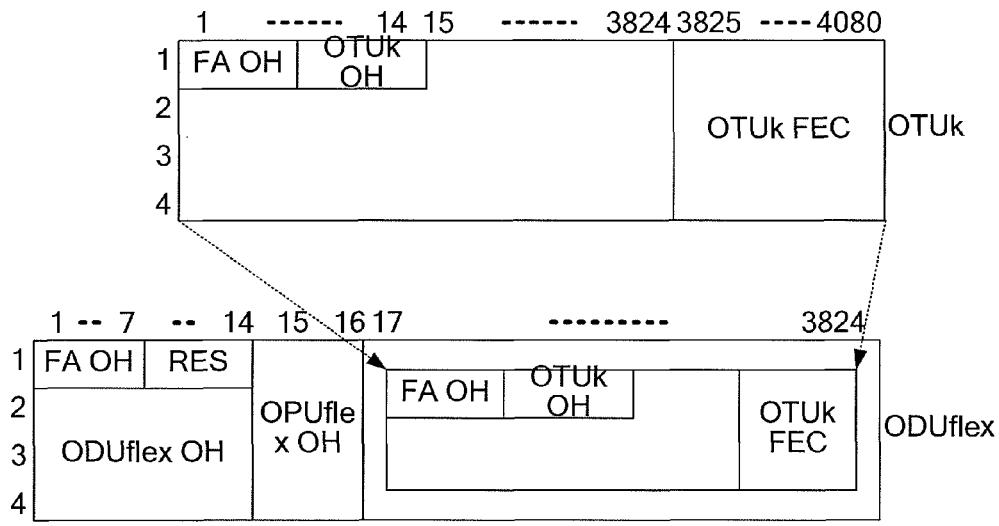
FIG. 2 is a schematic structural diagram of wrapping an OTUk signal into an ODU signal according to the first embodiment of the present invention.

FIG. 2 is a schematic structural diagram of wrapping an OTUk signal into an ODU signal according to the first embodiment of the present invention. As shown in FIG. 2, different types of OTUk signals (k=1, 2, 3) are wrapped into an ODU (ODUflex) signal. At this time, an ODUflex overhead and an OPUflex overhead need to be inserted. A unit structure in an upper part of FIG. 2 is a schematic structural diagram of an existing OTUk signal; a unit structure in a lower part is a schematic structural diagram of an ODUflex signal after the ODUflex overhead (that is, ODUflex Overhead, ODUflex OH) and the OPUflex overhead (that is, OPUflex OH) are inserted.

For bit rate after the OTUk signal is wrapped into the ODUflex signal, see Table 1.

TABLE 1

| ODUflex type (type) | ODUflex normal bit rate (normal bit rate) | ODUflex bit rate tolerance (bit rate tolerance) |
| --- | --- | --- |
| ODUflex for OTU1 | 239/238 × 255/238 × 2488320 kbit/s | ±20 ppm |
| ODUflex for OTU2 | 239/238 × 255/237 × 9953280 kbit/s | ±20 ppm |
| ODUflex for OTU3 | 239/238 × 255/236 × 39813120 kbit/s | ±20 ppm |

After the preceding processing of wrapping the OTUk signal into the ODU signal, this embodiment of the present invention may further include performing scheduling processing on the ODU signal, and re-multiplexing the ODU signal after being performed scheduling processing to the High Order OPUj signal. Through the ODU scheduling processing, flexibility of the system may be improved, so that units for wrapping the OTUk signal into the ODU signal and subsequent units for multiplexing the ODU signal to the OPUj signal may not be fixedly interconnected one by one.

Specifically, step 13 to step 14 may be as follows.

Figure 3:
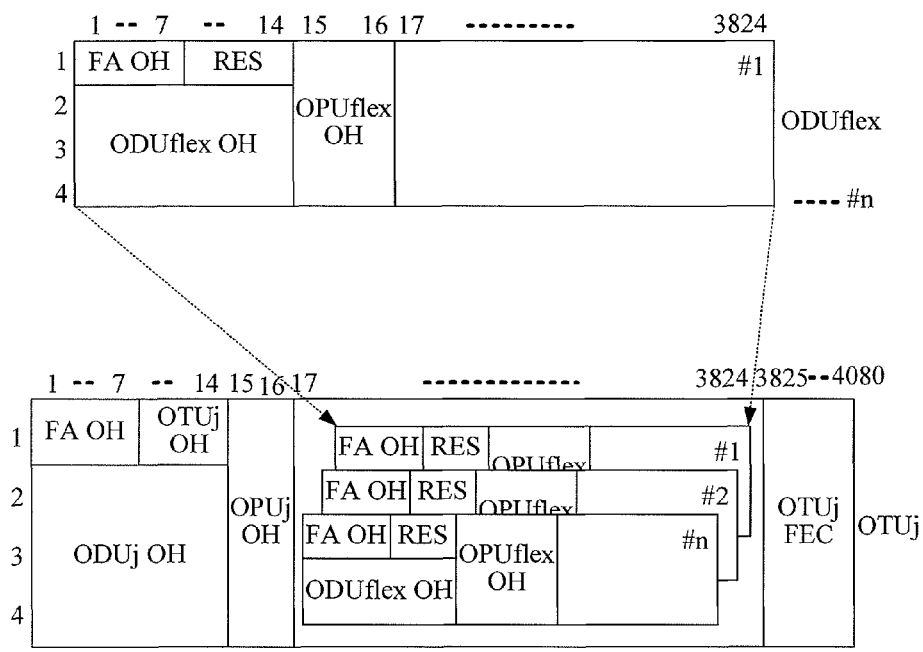
FIG. 3 is a schematic structural diagram of multiplexing an ODU signal to a High Order OPUj signal and wrapping the High Order OPUj signal into a High Order ODUj signal and a High Order OTUj signal according to the first embodiment of the present invention.

FIG. 3 is a schematic structural diagram of multiplexing an ODU signal to a High Order OPUj signal and wrapping the High Order OPUj signal into a High Order ODUj signal and a High Order OTUj signal according to the first embodiment of the present invention. The High Order OPUj (HO OPUj) (j=1, 2, 3, 4) signal is a signal with better performance than an OTUk signal, so as to ensure that the OTUk signal can be loaded into the OPUj signal (j>K). For example, an OTU1 signal is multiplexed and wrapped into an OPU2 signal. As shown in FIG. 3, a unit structural diagram in an upper part is a schematic structural diagram of an ODU (ODUflex) signal, where the multiplexing of n ODUflex signals is shown as #1 . . . #n. For the multiplexing to the HO OPUj, as well as wrapping into the ODUj and OTUj, an OPUj overhead (that is, OPUj OH), an ODUj overhead (that is, ODUj OH) and an OTUj overhead (that is, OTUj OH) need to be inserted. Moreover, a Forward Error Correction (Forward Error Correction, FEC) area of the OTUj needs to be added.

Transparent transmission of an OTU1 signal is taken as an example for further detailed description in the following.

In the prior art, the bit rate of an OTU1 signal is 255/238× 2488320 kbit/s±20 ppm.

After wrapping into the ODUflex signal in this embodiment of the present invention, it is obtained that the bit rate of the ODUflex signal is 239/238×255/238×2488320 kbit/s±20 ppm, which is approximately 2.67726 Gbps±20 ppm. The wrapping and mapping may use bit synchronization, so that the ODUflex signal is clock synchronized with the OTU1 signal.

Multiplexing of the ODUflex signal to an OPU2 is taken as an example.

Figure 4:
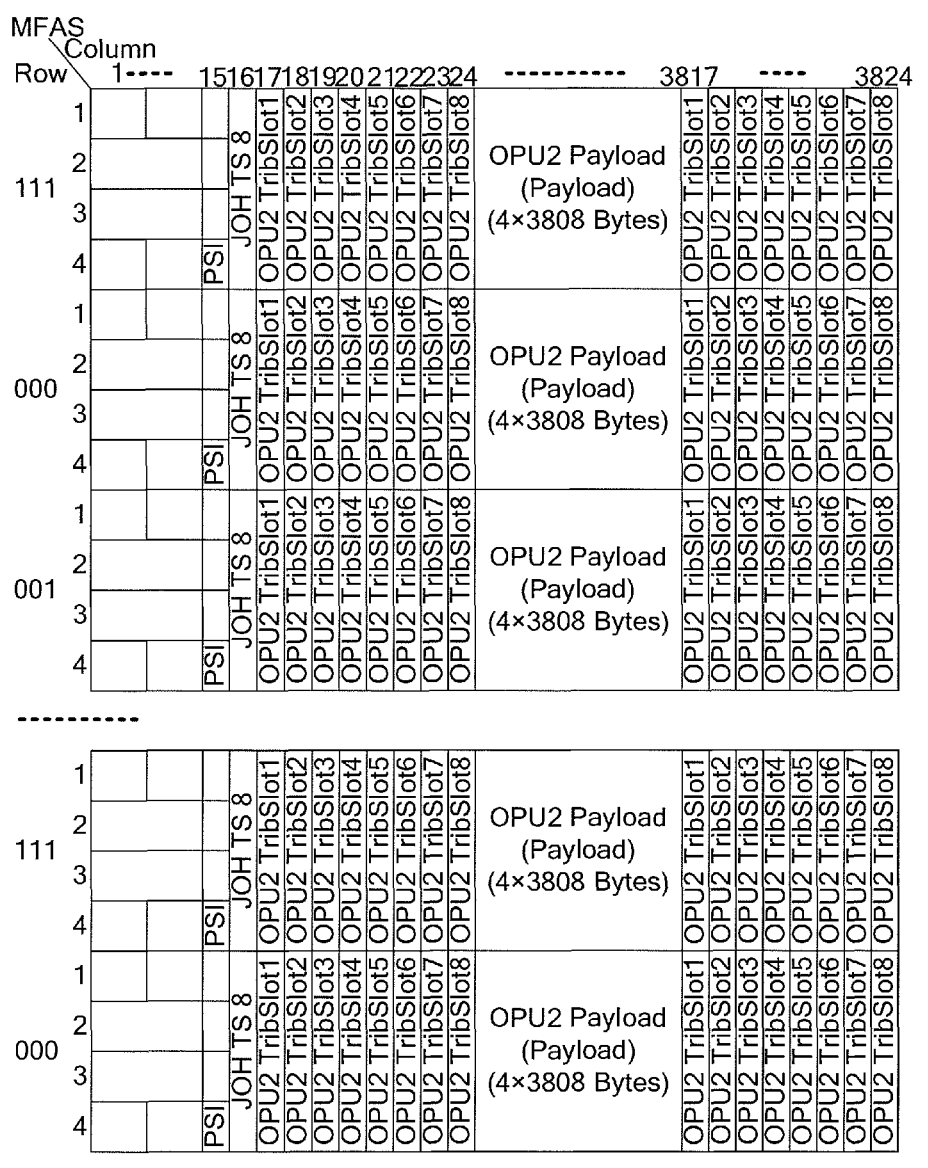

FIG. 4 is a schematic diagram of time slots after an OPU2 signal according to the first embodiment of the present invention. As shown in FIG. 4, each frame (represented by sequence numbers 000, 001, . . . , 111) of the OPU2 is divided into 8 time slot units (OPU2 TribSlot1, OPU2 TribSlot2, . . . , OPU2 TribSlot8), and bandwidth of each time slot is 1.249 Gbps±20 ppm. Because the bit rate of the ODUflex signal is approximately 2.67726 Gbps±20 ppm, the ODUflex signal occupies 3 time slot units of the OPU2.

The ODUflex signal may be mapped to the OPU2 by using a Generic Mapping Procedure (Generic Mapping Procedure, GMP) in an asynchronous mapping manner.

Figure 5:
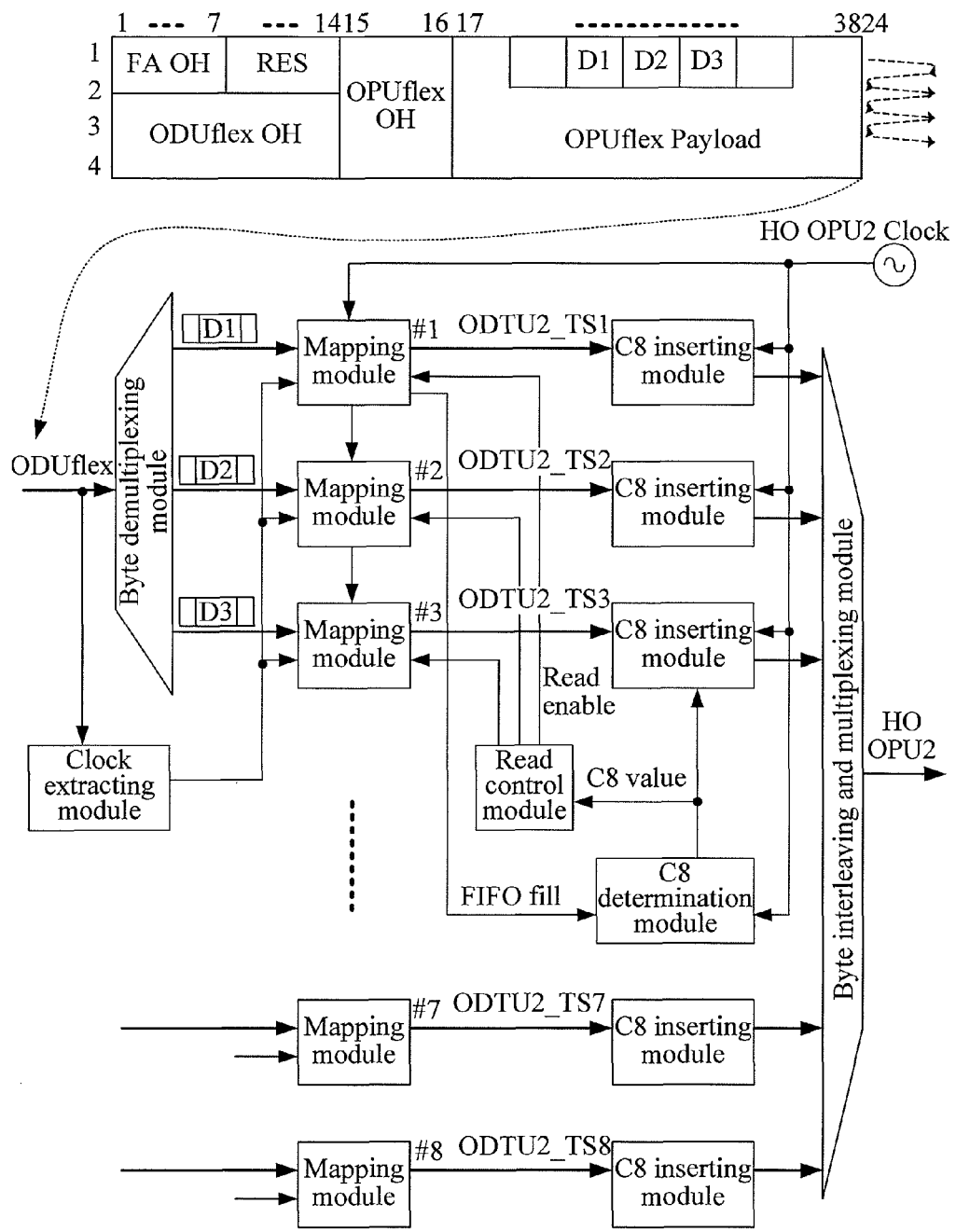
FIG. 5 is a schematic structural diagram of a mapping process of multiplexing and mapping an ODU signal to an OPU2 signal according to the first embodiment of the present invention.

FIG. 5 is a schematic structural diagram of a mapping process of multiplexing and mapping an ODU signal to an OPU2 signal according to the first embodiment of the present invention. As shown in FIG. 5, because an ODUflex signal needs to occupy 3 time slot units of an OPU2, the ODUflex signal is demultiplexed to 3 data units. Afterward, the multiplexing and mapping of the ODU signal to an HO OPU2 signal is implemented through a mapping module, a module for inserting an adjustment overhead (C8 overhead), and a byte interleaving and multiplexing module. The C8 overhead is used to indicate the byte number of data bytes, so that subsequent devices can distinguish the data bytes from padding bytes, thus ensuring correctness of signal processing.

Figure 6:
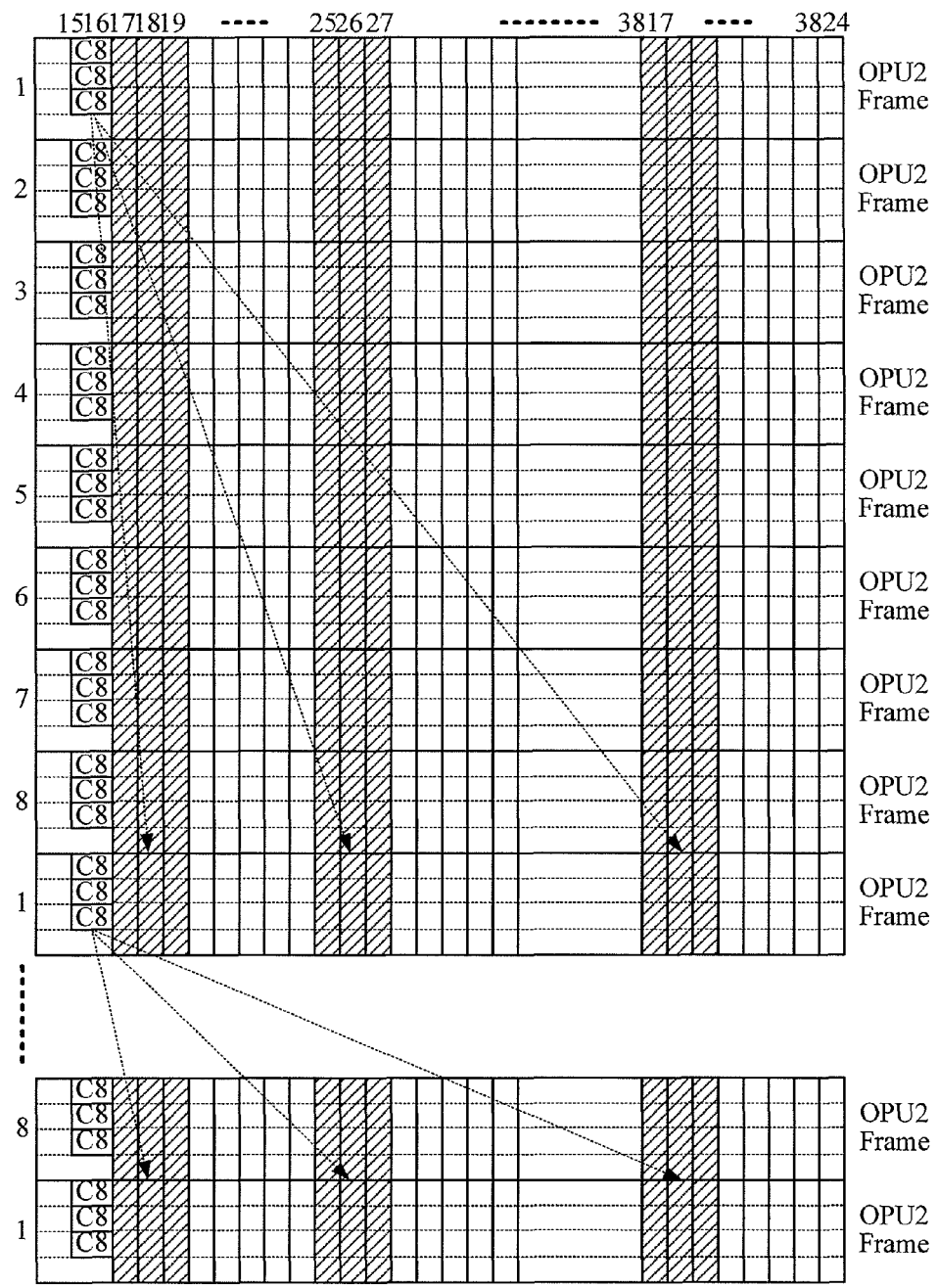
FIG. 6 is a schematic structural diagram of time slots of an OPU2 signal after mapping according to the first embodiment of the present invention.

FIG. 6 is a schematic structural diagram of time slots of an OPU2 signal after mapping according to the first embodiment of the present invention. As shown in FIG. 6, each OPU2 frame (represented by sequence numbers 1, 2, . . . , 8) includes 8 time slot units, and an ODUflex signal occupies 3 of the 8 time slot units (represented by a filled area in FIG. 6). In the mapping process, C8 is inserted to indicate the byte number of data bytes in each frame.

Being different from the prior art where an OTUk signal is unwrapped into an ODU signal, in this embodiment of the present invention, the OTUk signal is wrapped into the ODU signal, so that fully transparent transmission of the OTUk signal can be implemented.

Figure 7:
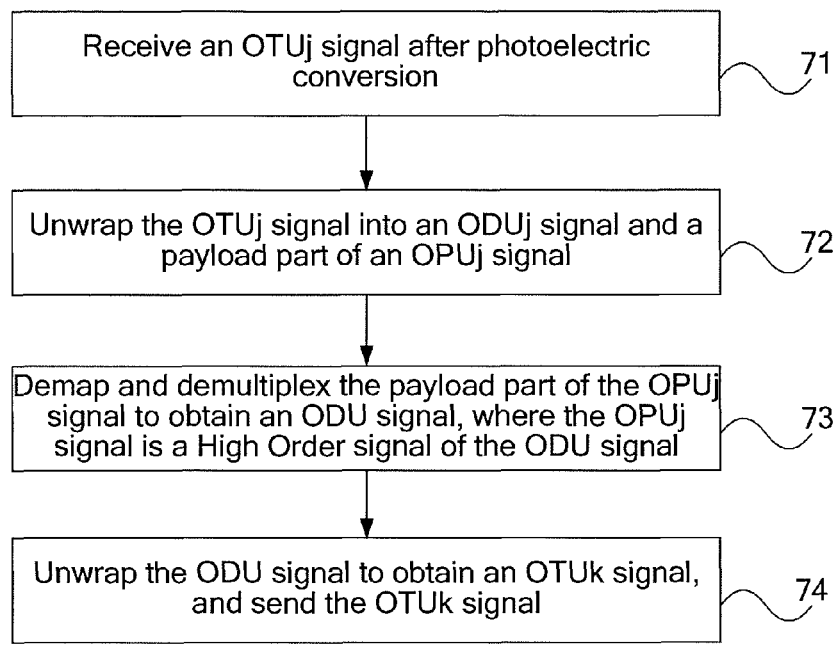
FIG. 7 is a schematic flow chart of a method according to a second embodiment of the present invention.

FIG. 7 is a schematic flow chart of a method according to a second embodiment of the present invention. This embodiment is designed for a downlink direction, that is, a direction of conversion from an HO electrical signal to an LO electrical signal. As shown in FIG. 7, this embodiment includes:

Step 71: A device for transmitting an OTU signal receives a second OTU signal (OTUj signal) after photoelectric conversion.

Step 72: The device unwraps the OTUj signal into an ODUj signal and a payload part of an OPUj signal.

Step 73: The device demaps and demultiplexes the payload part of the OPUj signal to obtain an ODU signal (ODUflex signal), where the OPUj signal is a High Order signal of the ODU signal.

Step 74: The device unwraps the ODU signal to obtain a first OTU signal (OTUk signal) and sends the first OTU signal.

Specifically, step 72 may be: extracting an OTUj overhead and an OTUj FEC of the OTUj signal to obtain an ODUj signal, extracting an ODUj overhead from the ODUj signal to obtain an OPUj signal, and extracting an OPUj overhead from the OPUj signal to obtain a payload part of the OPUj signal.

Taking an OPU2 as an example, step 73 may be specifically as follows.

Figure 8:
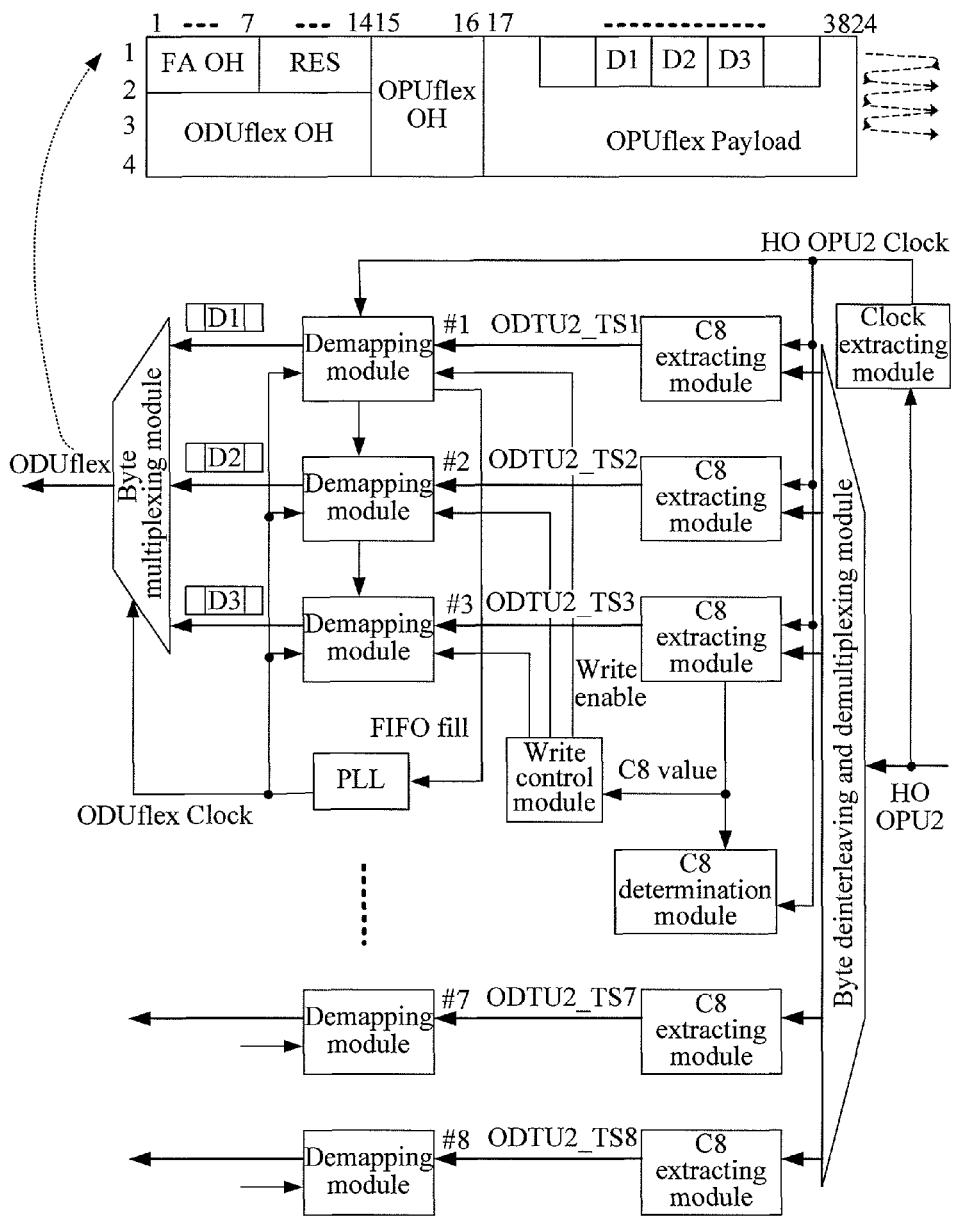
FIG. 8 is a schematic structural diagram of a process of demapping and demultiplexing an OPU2 signal to an ODU signal according to the second embodiment of the present invention.

FIG. 8 is a schematic structural diagram of a process of demapping and demultiplexing an OPU2 signal to an ODU signal according to the second embodiment of the present invention. As shown in FIG. 8, after deinterleaving and demultiplexing an HO OPU2, 8 time slot units may be obtained. Then, after extracting a C8 overhead and demapping processing, 3 occupied data units (which may form a complete ODUflex signal) may be obtained. Finally, the ODUflex signal is obtained by byte multiplexing the 3 data units.

Specifically, step 74 may be: extracting an ODUflex overhead of the ODUflex signal to obtain an OPUflex signal; and after extracting an OPUflex overhead, unwrapping the OPUflex signal to obtain an OTUk signal.

In this embodiment, the OTUk signal is wrapped into the ODUflex signal, so that fully transparent transmission of the OTUk signal can be implemented.

Figure 9:
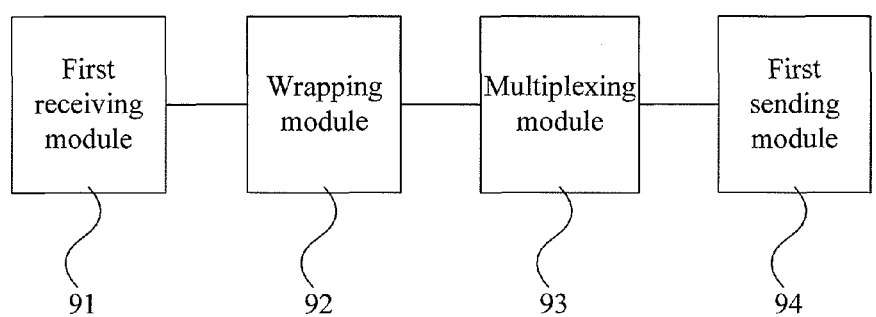
FIG. 9 is a schematic structural diagram of a device according to a third embodiment of the present invention.

FIG. 9 is a schematic structural diagram of a device according to a third embodiment of the present invention, where the device includes a first receiving module 91, a wrapping module 92, a multiplexing module 93 and a first sending module 94. The first receiving module 91 is configured to receive an OTUk signal after photoelectric conversion. The wrapping module 92 is connected with the first receiving module 91 and is configured to wrap the OTUk signal into an ODU signal. The multiplexing module 93 is connected with the wrapping module 92 and is configured to multiplex and map the ODU signal to an OPUj signal, where the OPUj signal is a High Order signal of the ODU signal. The first sending module 94 is connected with the multiplexing module 93 and is configured to wrap the OPUj signal into an ODUj signal and an OTUj signal, and send the ODUj signal and the OTUj signal.

To enhance flexibility, this embodiment may further include a first scheduling module, where the first scheduling module is connected with the wrapping module and the multiplexing module, so that the wrapping module and the multiplexing module are connected through the first scheduling module. The first scheduling module is configured to perform scheduling processing on the ODU signal and output the ODU signal after being performed the scheduling processing to the multiplexing module.

Being different from the prior art where an OTUk signal is unwrapped into an ODU signal, in this embodiment of the present invention, the OTUk signal is wrapped into the ODU signal, so that fully transparent transmission of the OTUk signal can be implemented.

Figure 10:
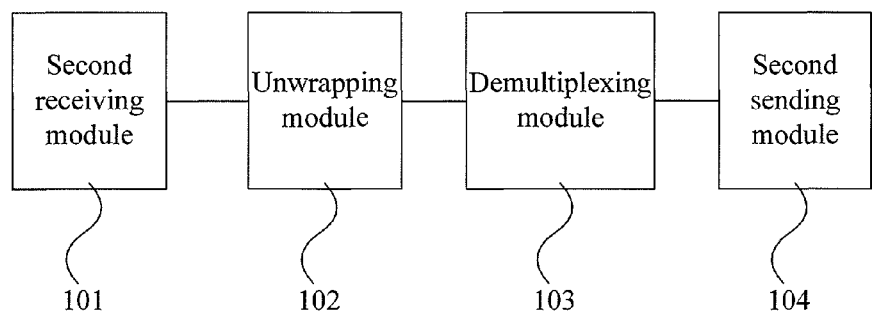
FIG. 10 is a schematic structural diagram of a device according to a fourth embodiment of the present invention.

FIG. 10 is a schematic structural diagram of a device according to a fourth embodiment of the present invention, where the device includes a second receiving module 101, an unwrapping module 102, a demultiplexing module 103 and a second sending module 104. The second receiving module 101 is configured to receive an OTUj signal after photoelectric conversion. The unwrapping module 102 is connected with the second receiving module 101 and is configured to unwrap the OTUj signal into an ODUj signal and a payload part of an OPUj signal. The demultiplexing module 103 is connected with the unwrapping module 102 and is configured to demap and demultiplex the OPUj signal to obtain an ODU signal, where the OPUj signal is a High Order signal of the ODU signal. The second sending module 104 is connected with the demultiplexing module 103 and is configured to unwrap the ODU signal to obtain an OTUk signal, and send the OTUk signal.

To enhance flexibility, this embodiment may further include a second scheduling module, where the second scheduling module is connected with the demultiplexing module and the second sending module, so that the demultiplexing module and the second sending module are connected through the second scheduling module. The second scheduling module is configured to perform scheduling processing on the ODU signal and output the ODU signal after being performed the scheduling processing to the second sending module.

In this embodiment, an OTUk signal is wrapped into an ODU signal, so that fully transparent transmission of the OTUk signal can be implemented.

Persons of ordinary skill in the art should understand that all or a part of the steps of the method according to the embodiments may be implemented by a program instructing relevant hardware. The program may be stored in a computer readable storage medium. When the program is run, the steps of the method according to the embodiments are performed. The storage medium includes any medium that is capable of storing program codes, such as a read-only memory (ROM), a random access memory (RAM), a magnetic disk, or an optical disk.

Finally, it should be noted that the preceding embodiments are merely used for describing the technical solutions of the present invention, but not intended to limit the present invention. It should be understood by persons of ordinary skill in the art that although the present invention has been described in detail with reference to the exemplary embodiments, modifications or equivalent replacements may still be made to the technical solutions of the present invention, however, these modifications or equivalent replacements can not make the modified technical solutions depart from the spirit and scope of the technical solutions of the present invention.

What is claimed is:

1. A method for transmitting an Optical Channel Transport Unit signal, the method comprising:
   receiving an Optical Channel Transport Unit OTUk signal after optical to electrical conversion;
   mapping the OTUk signal to an Optical Channel Payload Unit OPUflex payload part of an Optical Channel Data Unit ODUflex signal;
   inserting an OPUflex overhead and an ODUflex overhead into the ODUflex signal to obtain the ODUflex signal;
   multiplexing and mapping multiple ODUflex signals to an OPUj signal, wherein j>k; and
   wrapping the OPUj signal into an ODUj signal and wrapping the ODUj signal into an OTUj signal, and sending the OTUj signal.

2. The method according to claim 1, wherein the ODUflex signal is mapped to the OPUj signal by using a Generic Mapping Procedure (GMP) in an asynchronous mapping manner.

3. The method according to claim 1, wherein the multiplexing and mapping multiple ODUflex signals to the OPUj signal comprises:
   performing synchronous demultiplexing processing on the ODXflex signal to obtain M N-byte units;
   performing processing of mapping and inserting adjustment overheads on the M N-byte units respectively to obtain M time slot units; and
   performing byte interleaving and multiplexing processing on the M time slot units occupied by the ODU signal to obtain a signal mapped to a payload part of the OPUj signal.

4. The method according to claim 1, wherein the wrapping the OPUj signal into the ODUj signal and wrapping the ODUj signal into the OTUj signal, and sending the OTUj signal comprises:
   inserting an OPUj overhead into the signal mapped to the payload part of the OPUj signal to obtain the OPUj signal;
   inserting an ODUj overhead into the OPUj signal to obtain the ODUj signal;
   inserting an OTUj overhead and an OTUj Forward Error Correction (FEC) part into the ODUj signal to obtain the OTUj signal; and
   sending the OTUj signal.

5. The method according to claim 1, wherein before the multiplexing and mapping multiple ODUflex signals to the OPUj signal, the method further comprises: performing scheduling processing on the ODUflex signal.

6. A method for transmitting an Optical Channel Transport Unit signal, the method comprising:
   receiving an Optical Channel Transport Unit OTUj signal after optical to electrical conversion;
   unwrapping the OTUj signal into an Optical Channel Data Unit ODUj signal and unwrapping the ODUj signal into a payload part of an Optical Channel Payload Unit OPUj signal;
   demapping and demultiplexing the payload part of the OPUj signal to obtain multiple Optical Channel Data Unit ODUflex signals;
   extracting an ODUflex overhead and an OPUflex overhead of ODUflex signal; and
   demapping the ODUflex signal to obtain an OTUk signal from an Optical Channel Payload Unit OPUflex payload part of the ODUflex signal, and sending the OTUk signal, wherein j>k.

7. The method according to claim 6, wherein the unwrapping the OTUj signal into the ODUj signal and unwrapping the ODUj signal into the OPUj signal comprises: after extracting an OTUj overhead of the OTUj signal and stripping off an OTUj Forward Error Correction FEC part of the OTUj signal, extracting an ODUj overhead and an OPUj overhead to obtain the payload part of the OPUj signal.

8. The method according to claim 6, wherein the demapping and demultiplexing the payload part of the OPUj signal to obtain multiple Optical Channel Data Unit ODUflex signal comprises:
   performing byte deinterleaving and demultiplexing processing on the payload part of the OPUj signal to obtain M time slot units;
   performing processing of extracting adjustment overheads and demapping on the M time slot units respectively to obtain M N-byte units that are occupied; and
   performing synchronous multiplexing processing on the M N-byte units to obtain multiple ODUflex signals.

9. The method according to claim 6, wherein after the demapping and demultiplexing the OPUj signal to obtain multiple Optical Channel Data Unit ODUflex signal, the method further comprises: performing scheduling processing on the ODUflex signal.

10. A computer program product comprising a non-transitory computer readable storage medium storing program code thereon for transmitting an Optical Channel Transport Unit signal, the program code comprising instructions executed by a processor for a method that comprises:
    receiving an Optical Channel Transport Unit OTUk signal after optical to electrical conversion;
    mapping the OTUk signal to an Optical Channel Payload Unit OPUflex payload part of an Optical Channel Data Unit ODUflex signal;
    inserting an OPUflex overhead and an ODUflex overhead into the ODUflex signal to obtain the ODUflex signal;
    multiplexing and mapping multiple ODUflex signals to an OPUj signal, wherein j>k; and
    wrapping the OPUj signal into an ODUj signal and wrapping the ODUj signal into an OTUj signal, and sending the OTUj signal.

11. A computer program product comprising a non-transitory computer readable storage medium storing program code thereon for transmitting an Optical Channel Transport Unit signal, the program code comprising instructions executed by a processor for a method that comprises:
    receiving an Optical Channel Transport Unit OTUj signal after optical to electrical conversion;
    unwrapping the OTUj signal into an Optical Channel Data Unit ODUj signal and unwrapping the ODUj signal into a payload part of an Optical Channel Payload Unit OPUj signal;

demapping and demultiplexing the payload part of the OPUj signal to obtain multiple Optical Channel Data Unit ODUflex signals;

extracting an ODUflex overhead and an OPUflex overhead of ODUflex signal; and demapping the ODUflex signal to obtain an OTUk signal from an Optical Channel Payload Unit OPUflex payload part of the ODUflex signal, and sending the OTUk signal, wherein j>k.

* * * * *